(12) United States Patent
Søgaard et al.

(10) Patent No.: US 10,465,662 B2
(45) Date of Patent: Nov. 5, 2019

(54) IMPROVEMENTS RELATING TO LIGHTNING PROTECTION SYSTEMS FOR WIND TURBINE BLADES

(71) Applicant: Vestas Wind Systems A/S, Aarhus N. (DK)

(72) Inventors: Morten Bagger Søgaard, Arhus N (DK); Daniel Whitehouse, Isle of Wight (GB); Richard Baker, Aarhus N. (DK)

(73) Assignee: Vestas Wind Systems A/S, Aarhus N. (DK)

( * ) Notice: Subject to any disclaimer, the term of this patent is extended or adjusted under 35 U.S.C. 154(b) by 568 days.

(21) Appl. No.: 15/029,883

(22) PCT Filed: Oct. 15, 2014

(86) PCT No.: PCT/DK2014/050334
§ 371 (c)(1),
(2) Date: Apr. 15, 2016

(87) PCT Pub. No.: WO2015/055214
PCT Pub. Date: Apr. 23, 2015

(65) Prior Publication Data
US 2016/0245264 A1   Aug. 25, 2016

(30) Foreign Application Priority Data
Oct. 17, 2013 (GB) .................... 1318382.7

(51) Int. Cl.
*F03D 80/30* (2016.01)
*F03D 1/06* (2006.01)

(52) U.S. Cl.
CPC .......... *F03D 80/30* (2016.05); *F03D 1/0675* (2013.01); *F05B 2280/40* (2013.01); *Y02E 10/721* (2013.01)

(58) Field of Classification Search
CPC ..... F03D 80/30; F03D 1/0675; F05B 2280/40
(Continued)

(56) References Cited

U.S. PATENT DOCUMENTS

| | | | |
|---|---|---|---|
| 7,766,620 B2 | 8/2010 | Stam et al. | |
| 8,517,681 B2 * | 8/2013 | Naka | F03D 80/30 416/1 |

(Continued)

FOREIGN PATENT DOCUMENTS

| | | |
|---|---|---|
| CN | 101341334 A | 1/2009 |
| CN | 201991708 U | 9/2011 |

(Continued)

OTHER PUBLICATIONS

European Patent Office, Examination Report in EP14786795.6, dated Jul. 12, 2018.

(Continued)

*Primary Examiner* — Aaron R Eastman
(74) *Attorney, Agent, or Firm* — Wood Herron & Evans LLP

(57) ABSTRACT

A receptor arrangement for a wind turbine blade, the arrangement comprising a receptor component connectable to a down conductor of a lightning protection system wherein the receptor component is encapsulated by an insulating member. The invention extends to apparatus for lightning protection in a wind turbine blade including such a receptor arrangement connected to a down conductor, and also to a method of assembling lightning protection apparatus for a wind turbine blade.

21 Claims, 6 Drawing Sheets

(58) Field of Classification Search
USPC .................................................. 416/146 R
See application file for complete search history.

(56) References Cited

U.S. PATENT DOCUMENTS

| | | | | |
|---|---|---|---|---|
| 2002/0109055 | A1* | 8/2002 | Davis, Jr. ................ | F16M 7/00 248/188.5 |
| 2006/0280613 | A1* | 12/2006 | Hansen ................ | H02G 13/00 416/230 |
| 2007/0081900 | A1 | 4/2007 | Nies | |
| 2009/0053062 | A1* | 2/2009 | Arinaga ................ | H02G 13/00 416/146 R |
| 2009/0056968 | A1* | 3/2009 | Bertelsen ............. | H02G 13/00 174/2 |
| 2009/0257882 | A1 | 10/2009 | Olsen | |
| 2010/0263897 | A1* | 10/2010 | Nolletti ................ | H02G 13/00 174/2 |
| 2011/0142678 | A1 | 6/2011 | Santiago et al. | |
| 2011/0182731 | A1 | 7/2011 | Naka et al. | |
| 2011/0305574 | A1* | 12/2011 | Stiesdal ................ | F03D 1/065 416/146 R |
| 2012/0007620 | A1* | 1/2012 | Nolletti ................ | H01R 4/029 324/722 |
| 2012/0133146 | A1* | 5/2012 | Naka ..................... | H02G 13/00 290/55 |
| 2013/0078105 | A1 | 3/2013 | Drewes et al. | |
| 2013/0149154 | A1 | 6/2013 | Kuroiwa et al. | |

FOREIGN PATENT DOCUMENTS

| | | |
|---|---|---|
| DE | 102008007910 A1 | 8/2008 |
| EP | 1011182 A1 | 6/2000 |
| EP | 2110552 A1 | 10/2009 |
| EP | 2226497 A1 | 9/2010 |
| EP | 2395239 A1 | 12/2011 |
| EP | 2532893 A1 | 12/2012 |
| WO | 2007062659 A1 | 6/2007 |
| WO | 2007128314 A1 | 11/2007 |
| WO | 2008006377 A1 | 1/2008 |
| WO | 2011080177 A1 | 7/2011 |
| WO | 2013084634 A1 | 6/2013 |
| WO | 2013097855 A2 | 7/2013 |

OTHER PUBLICATIONS

Intellectual Property Office, Search Report issued in Application No. GB1318382.7 dated Apr. 30, 2014.
European Patent Office, International Search Report and Written Opinion issued in International Patent Application No. PCT/DK2014/050334 dated Dec. 11, 2014.
Intellectual Property Office, Search and Examination Report issued in Application No. GB1318383.5 dated Jun. 30, 2014.
European Patent Office, International Search Report and Written Opinion issued in International Patent Application No. PCT/DK2014/050335 dated Dec. 5, 2014.
Intellectual Property Office, Search and Examination Report issued in Application No. GB1318381.9 dated May 22, 2014.
European Patent Office, International Search Report and Written Opinion issued in International Patent Application No. PCT/DK2014/050333 dated Dec. 12, 2014.
European Patent Office, Extended European Search Report in EP 18168482.0, dated Sep. 13, 2018.
China National Intellectual Property Administration, Office Action in CN201480068822.1, dated Sep. 14, 2018.

* cited by examiner

IMPROVEMENTS RELATING TO LIGHTNING PROTECTION SYSTEMS FOR WIND TURBINE BLADES

TECHNICAL FIELD

The present invention relates to wind turbine blade structures and associated fabrication processes for improving the resilience of wind turbine blades to lightning strikes.

BACKGROUND

Wind turbines are vulnerable to being struck by lightning; sometimes on the tower, nacelle and the rotor hub, but most commonly on the blades of the turbine. A lightning strike event has the potential to cause physical damage to the turbine blades and also electrical damage to the internal control systems of the wind turbine. Wind turbines are often installed in wide open spaces which makes lightning strikes a common occurrence. Accordingly, in recent years much effort has been made by wind turbine manufacturers to design wind turbines so that they are able to manage effectively the energy imparted to them during a lightning strike in order to avoid damage to the blade and the associated cost of turbine down-time during blade replacement.

Lightning protection systems for wind turbine blades are known. In one example, an electrically conductive lightning receptor element is arranged on an outer surface of the blade to receive a lighting strike. Since the receptor element is electrically conductive, lightning is more likely to attach to the receptor element in preference to the relatively non-conductive material of the blade. The receptor element is connected to a cable or 'down conductor' that extends inside the blade to the root and from there connects via an armature arrangement to a charge transfer route in the hub, nacelle and tower to a ground potential. Such a lightning protection system therefore allows lightning to be channelled from the blade to a ground potential safely, thereby minimising the risk of damage. However, the discrete receptor elements are relatively complex to install during fabrication of the blade and, moreover, they leave a significant portion of blade area exposed to a risk of lightning strike.

Observation of the effects of lightning strikes on turbine blades has revealed that the highest proportion of lightning strikes happen at the blade tips. To address this, WO2005/031158 proposes a turbine blade having a solid metal tip. Although the solid metal tip provides a robust conductive body to withstand a high number of lightning strikes, in some circumstances lightning may still strike the blade in-board of the tip thereby having the potential to cause blade damage.

A further lightning protection is described in WO2013/007267, which proposes demarcating a turbine blade into a plurality of different zones, each zone being provided with a different protective measure that is selected depending on the expected impact of a lightning strike within that blade zone. Here, a high risk strike zone such as the tip can be protected with robust protection measures such as a solid metal tip, whilst protective measures in low risk strike zones can potentially be removed altogether.

It is against this context that the invention has been devised.

SUMMARY OF THE INVENTION

Accordingly, in a first aspect, the invention provides a wind turbine blade having a receptor arrangement, the receptor arrangement, comprising a receptor component connectable to a down conductor of a lightning protection system wherein the receptor component is encapsulated by an electrically insulating member.

In one embodiment, the insulating member which is an electrically insulating member is a mouldable component, preferably polyurethane or other high dielectric polymer, so that it may be pressure moulded around the receptor component to encapsulate it entirely. Such an arrangement provides a close fitting non-conductive housing for the receptor component and ensures that streamer and corona initiation from the receptor component during environmental conditions is suppressed.

Conveniently, the receptor component may be arranged so that it can be electrically coupled to lightning receptor elements provided, respectively, on windward and leeward surfaces of the blade. To this end, in one embodiment the receptor component includes a single receptor base that can be engaged with first and second receptor elements. In another embodiment, however, the receptor component includes a first receptor base associated with a first blade surface region and a second receptor base associated with a second blade surface region, wherein the first receptor base and the second receptor base are encapsulated by the insulating member.

The insulating member may be annular and, moreover, may be shaped to support each of the first and second receptor bases proximate to their respect blade surface regions. In this case, the insulating member may be C-shaped, for example.

Where the receptor component includes more than one receptor base, they may be connected via an electrical link that preferably extends within the insulating member. To provide flexibility during assembly, the electrical link may be a braided conductor such as zinc coated copper.

The receptor component may be connected into a down conducting system of a wind turbine blade. To ensure the integrity of the electrical connection, the receptor component is preferably, but not exclusively, connected to the down conductor using a suitable welding technique, for example exothermic welding.

In order to guard again a lightning strike attaching to either the receptor component or the down conductor, these components may be insulated. A receptor base may be coupled to a down conductor, wherein the receptor base and the down conductor are housed by an electrically insulating housing.

In one embodiment, the electrically insulating is a unitary part and so is common to multiple receptor bases along a length of down conductor. This provides a long unbroken insulated cover which is highly effective at guarding against lighting strikes to the components housed within it.

In another aspect, the invention provides a method of assembling lightning protection apparatus for a wind turbine blade, comprising: arranging a plurality of receptor bases in a predetermined pattern; connecting the plurality of receptor bases to a down conductor; and, insulating the plurality of receptor bases and the down conductor.

The method of the invention therefore provides a means to assemble an integrated receptor and down conducting system for a wind turbine blade that can be installed in a composite mould during a blade lay-up phase. Moreover, the receptor bases are fully encapsulated in the region that they meet the down conductor which results in an extremely well protected electrical system.

In a preferred embodiment, the method includes moulding a unitary insulating housing about the plurality of receptor bases and the down conductor, thereby providing a further level of electrical insulation. Preferably, the receptor bases are encased in respective insulating members before the unitary housing is moulded.

It will be appreciated that preferred and/or optional features of the first aspect of the invention may be combined with the other aspects of the invention, and vice versa. The invention in its various aspects is defined in the independent claims below and advantageous features are defined in the dependent claims below.

BRIEF DESCRIPTION OF THE DRAWINGS

For a fuller understanding of the invention, some embodiments of the invention will now be described with reference to the following drawings, in which.

DETAILED DESCRIPTION

Figure 1:
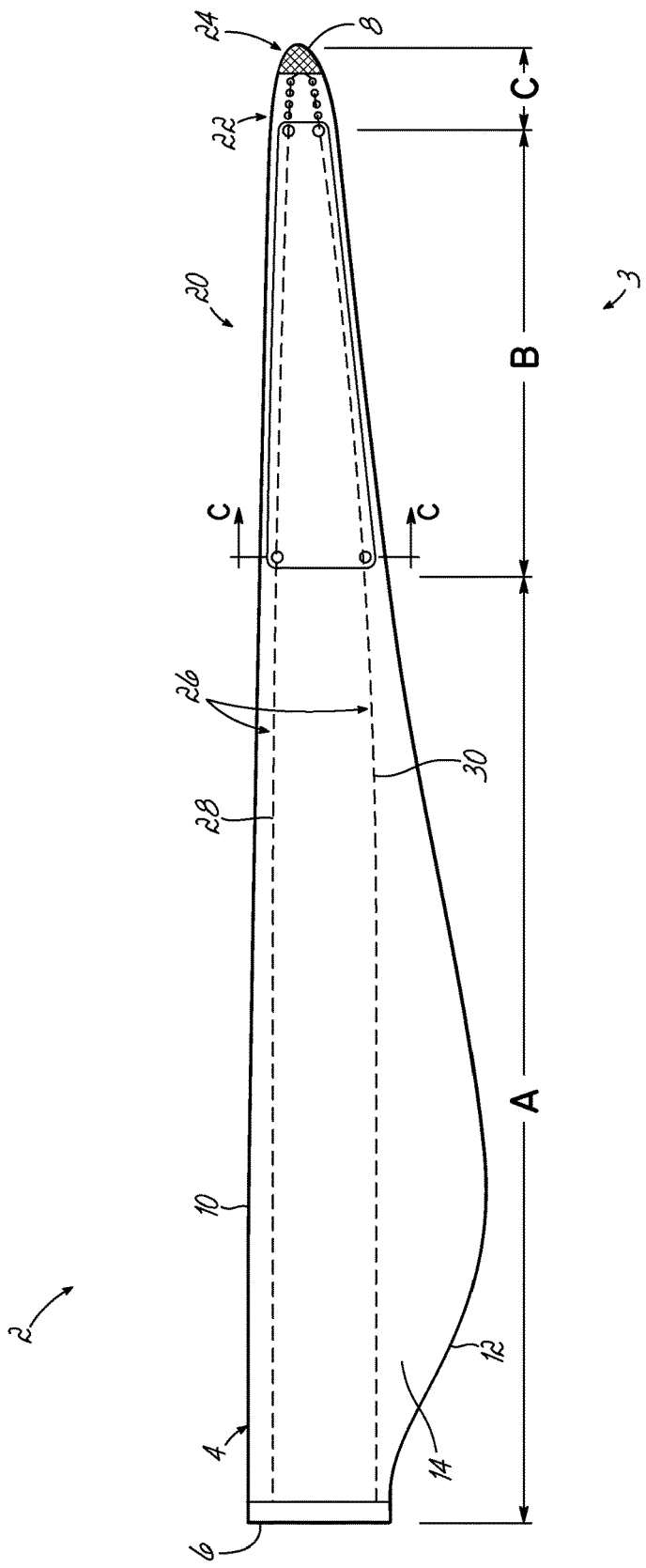
FIG. 1 is a plan view of a wind turbine blade equipped with a lightning protection system.

With reference to FIG. 1, a wind turbine blade 2 incorporates a lightning protection system 3. The blade 2 is formed from a blade shell 4 having two half-shells. The half-shells are typically moulded from glass-fibre reinforced plastic (known as 'GFRP' or, simply 'GRP') that comprises glass fibre fabric embedded in a cured resin matrix. The precise construction of the blade shell 4 is not central to the invention and so further detailed description is omitted for clarity.

The blade comprises a root end 6, at which the blade 2 would be attached to a rotor hub of a wind turbine, a tip end 8, a leading edge 10 and a trailing edge 12. A first surface 14 of the blade 2 defines an aerodynamic profiled surface that extends between the leading edge 10 and the trailing edge 12. The blade 2 also includes a second surface also extending between the leading edge 10 and trailing edge 12, which is not shown in the plan view of FIG. 1, but which is indicated as reference numeral 16 in FIGS. 3 and 4, for example.

When the blade 2 is attached to a rotor hub of a wind turbine, airflow strikes the surface 16 of the blade 2 and for this reason the surface 16 is also referred to as a 'pressure side' or 'windward side' in the art. Conversely, the surface 14 is referred to as the 'suction side' or 'leeward side'.

Turning to the lightning protection system 3, this is based on a 'zoning' concept in which the blade 2 is demarcated in a longitudinal or 'span-wise' direction into regions or 'zones' depending on the probability of receiving a lightning strike and severity of the strike in that region. A similar principle is described in WO2013/007267.

In this embodiment, the blade 2 is divided into three zones for the purposes of lightning protection—these are illustrated in FIG. 1 as zones A, B and C. The lightning protection facility that is used in each of the zones is selected based on a set of lightning strike parameters, such as peak current amplitude, specific energy, impulse shape and total charge that the blade 2 is expected to withstand in each of the zones. A brief explanation of the different zones now follows, by way of example.

Zone A extends from the root end 6 of the blade to approximately 60% of the blade length in the span-wise direction. In this zone, the blade 2 has a low risk of a lightning strike and so will be expected to receive a low incident of strikes and low current amplitudes, which is acceptable for blade structural impact. In this embodiment, the blade 2 is not equipped with any external lightning protection within this zone.

Zone B extends from the end of zone A to approximately 90% of the blade length in a span-wise direction. In this zone the blade 2 has a moderate risk of lightning strike and is expected to withstand moderately frequent direct lightning strike attachments having increased impulse current, peak current and total charge transfer. Accordingly, the blade 2 is provided with a first lightning protection sub-system 20 in the form of a surface protection layer.

Finally, zone C extends from the end of zone B to the tip end 8 of the blade 2. In this zone the blade 2 is subject to a high likelihood of lightning strikes and is expected to withstand peak current amplitudes of in excess of 200 kA and total charge transfer in excess of 300 Coulombs and, moreover, a high incident of strikes. To provide the required level of protection for the blade, zone C includes two further lightning protection sub-systems. Firstly, there is provided an array of receptors (hereinafter 'receptor array') 22 and, secondly, there is provided a blade tip assembly 24. Both the receptor array 22 and the blade tip assembly 24 are electrically connected to a down conducting system 26, comprising first and second down conductors 28, 30 running along the length of the blade 2 from the tip end 8 to the root end 6, generally being arranged adjacent the leading edge 10 and trailing edge 12 of the blade 2, respectively. Details of the receptor array 22, the blade tip assembly 24 and the down conducting system 26 will be described later.

As has been mentioned, zone B includes a surface protection layer 20 which is a conductive layer formed over the surface of, or integrated into, both the upper half-shell and the lower half-shell of the blade 2. The conductive layer 20 may be a metallic screen or mesh, but preferably an expanded metal foil that acts to attract lightning strikes over a large area of the blade and which is connected to the down conducting system 26 in a manner that will be described. The thickness of the conductive layer 20 is such that the aerodynamic profile of the blade 2 is unaffected and so it is preferred that the conductive layer is between 1 mm and 5 mm in thickness. The precise structure of the surface protection layer 20 is not central to the invention and so will not be described in further detail here.

Figure 2:
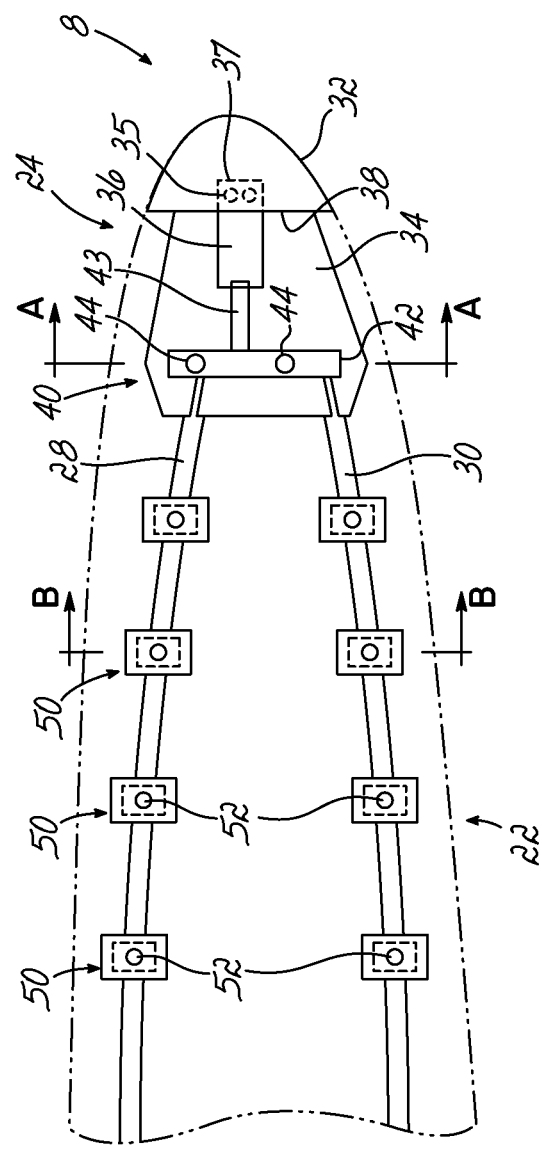
FIG. 2 is an enlarged view of a region of the turbine blade in FIG. 1, showing in more detail apparatus relating to the lightning protection system.

The blade tip assembly 24 and the receptor array 22 will now be described in more detail with reference to FIGS. 2 to 7. FIG. 2 illustrates an enlarged portion of the blade 2 in zone C and so shows the blade tip assembly 24 and the receptor array 22 in more detail. The blade 2 is shown here as having the blade tip assembly 24 attached to it. However, it should be appreciated that the blade tip assembly 24 is installable as a unit into the blade 2 during a manufacturing process.

The blade tip assembly 24 comprises a conductive blade tip module 32 and an insulating member which, in this embodiment, is a non-conductive insert member 34 coupled to the blade tip module 32. The blade tip module 32 is preferably formed from solid metal so as to provide an extremely robust lightning receptor at the very tip of the blade 2, able to withstand a high number of direct lightning attachments without suffering damage and without requiring frequent maintenance and/or inspection. The blade tip module 32 is preferably solid copper or a copper alloy such as bronze, and is cast in such a shape so as to provide an aerodynamic tip profile for the blade 2, and particularly the high curvature regions of the leading and trailing edges which are particularly attractive to lightning strike attachment. Forming the blade tip module 32 in solid metal achieves a high melting point, which is a major factor in avoiding damage during lightning strikes, and also provides good electrical conductivity into the down conducting system. It will be appreciated that metals and alloys other than copper would also be suitable.

It is preferred that the blade tip module 32 is long enough to encompass the high curvature regions of the leading and trailing edges 10, 12 of the blade, although due to the solid metal tip being of relatively high mass, it is generally an aim to design the tip to be as small as possible without reducing the ability to attract lightning to the tip. Generally, therefore, the blade tip module 32 has a length that is less than 1% of the total blade length and, more preferably, below 0.5% of the total blade length. By way of example, on a blade with a length of 60 m, the tip may be approximately 10 cm in length.

The blade tip module 32 is attached to the insert member 34 by way of a coupling member or 'coupler' 36 shown here as an attachment plate. The plate 36 has a rectangular shape and is secured by bolts 35 at one of its ends to a correspondingly shaped cavity 37 provided at an attachment face 38 of the blade tip member 32. The plate 36 is conductive and is preferably solid metal such as stainless steel, although other metals (e.g. copper) or metal alloys are acceptable.

The plate 36 provides a means by which the insert member 34 may be attached to the blade tip module 32. In this embodiment, the insert member 34 is injection moulded around the plate 36 which is placed into the mould, with or without the blade tip module 32 attached to it, prior to the start of the moulding process.

The moulded insert member 34 provides a solid base by which the blade tip assembly 24 may be incorporated into a blade 2 during a fabrication process. For example, during the lay-up of the blade, suitable blade skin and other structural components such as glass fabric layers or pre-preg materials may be arranged in a truncated blade mould that does not have a mould surface shaped to define a blade tip. The blade tip assembly 24 may then be arranged with respect to the mould such that the insert member 34 lies adjacent the prepared blade skin components and the blade tip module is located against the truncated end of the mould. In the conventional way, the insert member 34 may then be incorporated into the blade 2 during a resin impregnation process so that, following curing, the blade tip assembly 24 forms an integral part of the blade 2, the insert member 34 providing a bonding surface to hold the entire assembly in the blade shells.

In this embodiment the insert member 34 is polymeric, and it is preferred that the material has a high dielectric strength, for example in excess of 25 kV/mm which surrounds the internal metal parts with a minimum thickness of approximately 10 mm. A suitable material would be polyurethane.

As can be appreciated from FIG. 2, the insert member 34 is comparatively wide and has a width greater than 50% of the width of the corresponding section of the blade 2. The profile of the insert member 34 generally corresponds to the aerodynamic profile of the blade 2.

Since the plate 36 is removably attached to the blade tip module 32, removal and replacement of the blade tip module 32 during the life of the blade 2 is permitted. However, the plate 36 could alternatively be formed as an integral part of the blade tip module 32 during casting.

Figure 7:
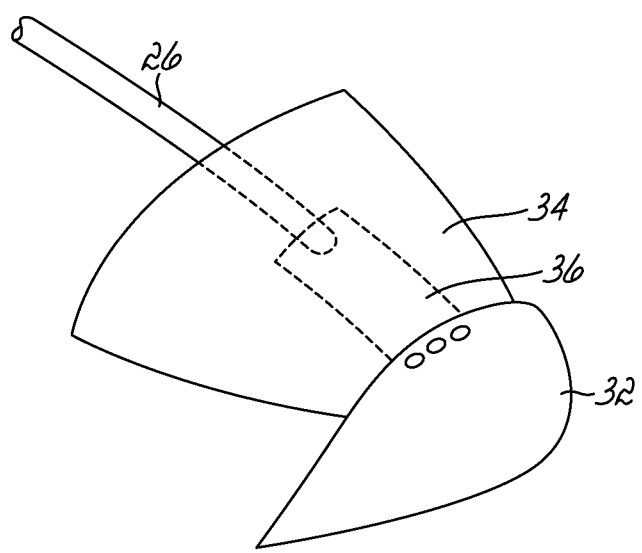
FIG. 7 is a perspective view of an alternative blade tip assembly.

In order to channel energy from a lightning strike on the blade tip module 32 to the blade root end 6, the blade tip assembly 24 is connected to the down conducting system 26. In one embodiment, as shown in FIG. 7, a single corona-inhibiting conducting cable of the down conducting system 26 is connected directly to the plate 36 by a suitable connecting method such as exothermic welding. A robust conductive coupling is therefore provided between the plate 36 and the down conducting system 26. In such an arrangement, it is preferred, although not essential, that the cable is welded to the plate 36 prior to the insert member 34 being moulded over the plate 36 in which case the cable forms a unit with the blade tip assembly 24 for the purposes of the blade fabrication process.

However, in the illustrated embodiment, the down conducting system 26 is connected to the blade tip assembly 24 in a different way. As shown in FIG. 2, the blade tip assembly 24 also includes a receptor arrangement 40 which, in this embodiment, is in the form of an elongate block-like receptor base 42 formed from a conductive material, and preferably a metallic material such as brass. The receptor base 42 extends transverse (i.e. chord-wise) to the longitudinal axis of the blade tip assembly 24 and is spaced (in a span-wise direction) from the blade tip module 32 at the far end of the insert member 34.

The receptor base 42 is electrically linked to the blade tip module 32 by a conductive link 43 which, in this embodiment, is a cable that is sheathed in a corona-inhibiting material, so as to suppress streamers and corona initiating from the cable 43. In contrast to the embodiment of FIG. 7, in this embodiment, both the first and second down conductors 28, 30 of the down conducting system 26 are directly connected to the receptor base 42. As before, preferably the down conductors 28, 30 are welded to the receptor base 42 prior to formation of the insert member 34 to encapsulate the components within it so that the insert member 34 encapsulates the plate 36 and at least part of the receptor arrangement. It will be appreciated therefore that the plate 36, the cable 43 and the receptor base 42 electrically couple the metal tip and the down conducting system 26. In principle, it should be noted that any number of electrical components could form the coupler between the tip and the down conducting system.

Figure 3:
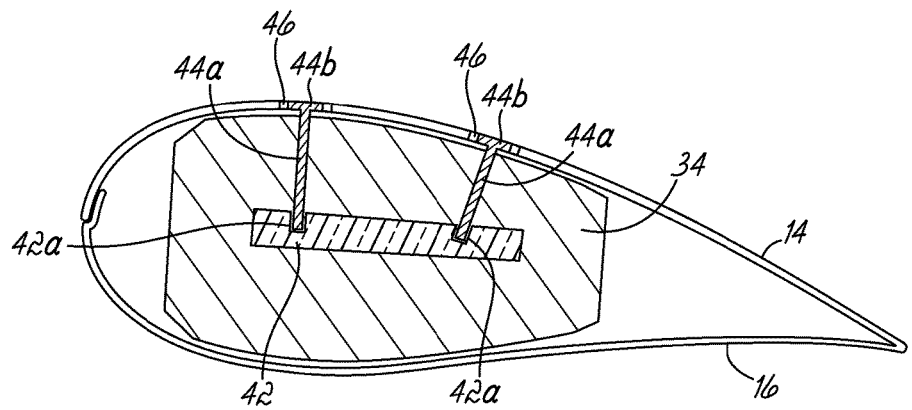
FIG. 3 is a section through the turbine blade in FIG. 2 along the line A-A.

The receptor base 42 forms a receiving point for a set of receptor elements 44 that punctuate the shell of the blade 2 and couple to the receptor base 42. As best shown in FIG. 3, the receptor elements 44 take the form of bolts having a shank 44a that extends into the blade 2 and is received into respective sockets 42a formed in the receptor base 42, and a head 44b that is countersunk into the shell so that an upper face of the head 44b sits flush with the surrounding surface of the blade 2 so as not to affect the blade aerodynamics.

In order to avoid potential 'flashovers' between the bolt head 44b and any nearby internal conductive components of the blade skin during a lightning strike, the head 44b is provided with an insulating protective collar 46, which is preferably formed from a suitable engineering plastics such as PEEK (polyetheretherketone). The protection collar additionally provides protection against collateral heat damage to the blade skin during a lightning strike to the receptor elements.

The insulating member 34 is sandwiched between an interior of the leeward surface 14 and an interior of the windward surface 16. Adhesive (not shown) is located between the insulating member 34 and the interiors of leeward and windward surfaces 14, 16 to bond the insulating member to the interior of the blade. The insulating member 34 substantially fills the hollow volume between the leeward surface 14 and the windward surface 16 at the tip of the blade. The insulating member 34 extends in a chordwise direction from the leading edge of the blade towards the trailing edge of the blade, and in a spanwise direction from the conductive blade tip 8 towards the root of the blade. In this example the insulating member 34 is a single block which encases the coupler 36 and the receptor base 42. The use of a single block means that the receptor base 42 and the coupler 36 can be provided as single module which allows for easy installation into the blade.

The receptor elements 44 are mountable on the blade 2 after it has been manufactured with the blade tip assembly 24 in position. Following completion of the blade 2, suitable apertures are created in the shell of the blade 2 and suitable tapped holes in the receptor base 42 are created for securing the receptor elements 44 in position. In order to guard against the loosening of the receptor elements 44, suitable locking means (not shown) may be provided which may take the form of a plastic pellet or patch received in a lower part of the shank 44a that engages the receptor base 42.

In this embodiment, two receptor elements 44 are provided, both on the leeward surface 14 of the blade 2. However, it will be appreciated that further receptor elements may also be provided on the leeward side of the blade 2 if desired.

From the above discussion, it will be understood that the blade tip assembly 24 provides two receptor points for lightning attachments: firstly the metal blade tip module 32 and, secondly, the receptor arrangement 40. The benefit of this is that a lightning strike will be attracted to the receptor elements 44 rather than attaching to the down conducting system 26 or other internal metal parts of the system. By way of further explanation, during the high electric field environmental conditions immediately preceding a lightning strike, the enhanced electric field at the tip of the blade 2 will induce ionization of the atmosphere and charge transfer from the blade tip module 32 thereby under certain conditions resulting in a 'space charge' surrounding the tip end 8. The existence of this space charge can in some circumstances modify the electric field around the blade tip thus deflecting the return stroke away from the conductive blade tip module 32 so that lightning attaches to conductive components within the blade, for example components of the down conducting system 26. The receptor arrangement 40 of the blade tip assembly 24 provides intentional streamer emission points adjacent to the tip and so may serve to 'intercept' the lightning strike, the lightning strike attaching properly to the receptor elements 44 and the receptor base 42 instead of attaching to other less shielded components of the blade 2. This greatly reduces the risk of blade damage at various blade angles.

Turning now to the tip receptor array 22. As has been mentioned above the blade tip assembly 24 is connected to the down conducting system 26 which comprises first and second down conducting cables 28, 30 which run the spanwise length of the blade 2 to its root end 6. The down conducting system 26 is also connected to the tip receptor array 22 of the blade 2, which will now be described in further detail.

As shown in FIG. 2, the tip receptor array 22 comprises a plurality of receptor components 50 that are distributed adjacent the leading and trailing edges 10, 12 on the leeward surface 14 of the blade 2. In this embodiment, eight receptor components 50 are provided, and each receptor component 50 is coupled to a first receptor element 52 provided on the leeward surface 14 of the blade and a second receptor element 54 provided on the windward surface 16 of the blade 2. Note that the windward receptor elements 54 are not shown in FIG. 2, but are shown in FIG. 4.

Figure 4:
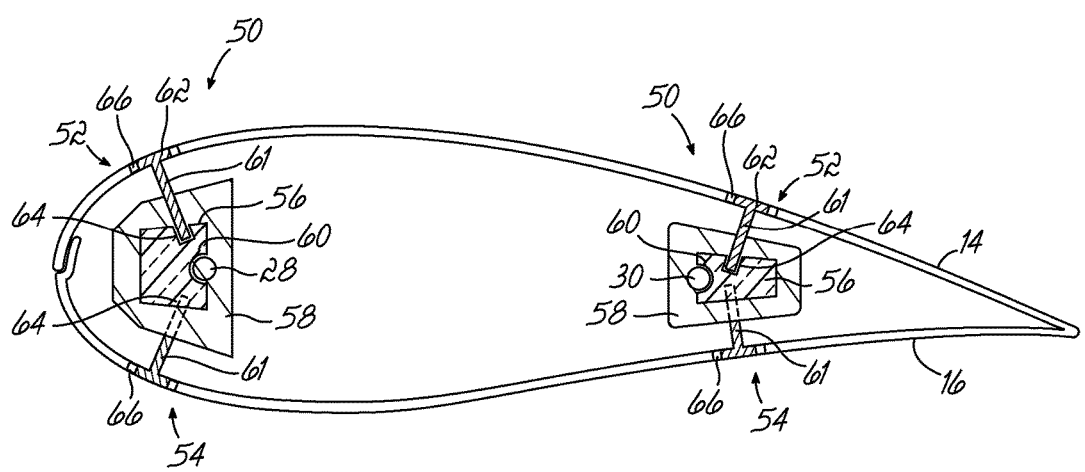
FIG. 4 is a section through the turbine blade in FIG. 2 along the line B-B.

With reference now to FIG. 4, which shows the structure of the receptor components 50 and the receptor elements 52, 54 in more detail, each of the receptor components 50 includes a block-like receptor base 56 and an insulating member 58 that encapsulates the receptor base 56.

The receptor base 56 is conductive, and preferably brass. The insulating member 58 is moulded directly to the receptor base 56 and so serves to suppress the initiation of leaders from the receptor base 56 during highly charge environmental conditions, which thereby guards against a lightning strike directly onto the receptor base 56 rather than on a receptor element 52, 54. Each receptor base 56 include a corresponding recess 60 through which the down conductors 28, 30 are routed so as to connect the receptor bases 56 into the down conducting system 26. Therefore, the encapsulation of the receptor bases 56 also encapsulates the junction between the down conducting system and the receptor bases 56. The insulating members 58 are formed of a suitable polymer having a high dielectric strength, and it is envisaged that the insulating members will be polyurethane, although other insulating materials are acceptable.

The insulating members 58 are sandwiched between an interior of the leeward surface 14 and an interior of the windward surface 16. Adhesive (not shown) is located between the insulating members 58 and the interiors of the leeward and windward surfaces 14, 16 to bond the insulating members to the interior of the blade. It should be appreciated that FIG. 4 shows a cross section through the insulating members 58 and that the receptor bases 56 are fully encapsulated by the insulating members 58. The insulating members 58 may have a width in the span-wise direction of around 15 cm.

Although not shown in FIG. 4, the receptor components 50 may also be installed in suitable locations within the interior of the blade 2 by spacing elements that space and hold each of the receptor components 50 in a predetermined position relative to the blade shell.

As mentioned, each receptor base 56 connects to two receptor elements 52, 54: one on each of the leeward and windward surfaces 14, 16 of the blade 2. This arrangement reduces the number of receptor bases required which reduces the cost and weight of the blade as a whole. In addition, the receptor bases only need to be installed in one of the blade half-shells during blade assembly which speeds up the fabrication time and simplifies the fabrication process. The receptor components 50 are attached to the blade half shell by adhesive, such as an epoxy adhesive.

Each receptor element 52, 54 is in the form of a bolt having a shank 61 and a head 62. The shank 61 extends into the blade 2 engages into a socket 64 in the receptor base 56. The head 62 lies against and is countersunk into the blade shell so that an upper face of the head 62 is flush with the surrounding surface of the blade 2. Like the receptor elements 44 provided on the blade tip assembly 24, the receptor elements 52, 54 of the tip receptor array 22 are also provided with a polymeric collar 66 to guard against surface flashovers during a lightning strike. The protection collar additionally provides protection against collateral heat damage to the blade skin during a lightning strike to the receptor.

Since the receptor components 50 are installed in region of the blade 2 that has a relatively shallow depth, preferably the receptor elements 52, 54 are joined to the receptor bases 56 offset from one another or 'staggered' in a spanwise direction of the blade, as is shown in FIG. 4. This avoids the shanks 60 of opposing receptor elements 52, 54 contacting one another when installed.

In the embodiment of FIG. 4, the receptor component 50 includes a single-piece receptor base 56 which connects to two receptor elements 52, 54 provided on the leeward and windward surfaces 14, 16 of the blade 2. Different configurations of receptor components are envisaged, and one such example will now be described with respect to FIG. 5.

Figure 5:
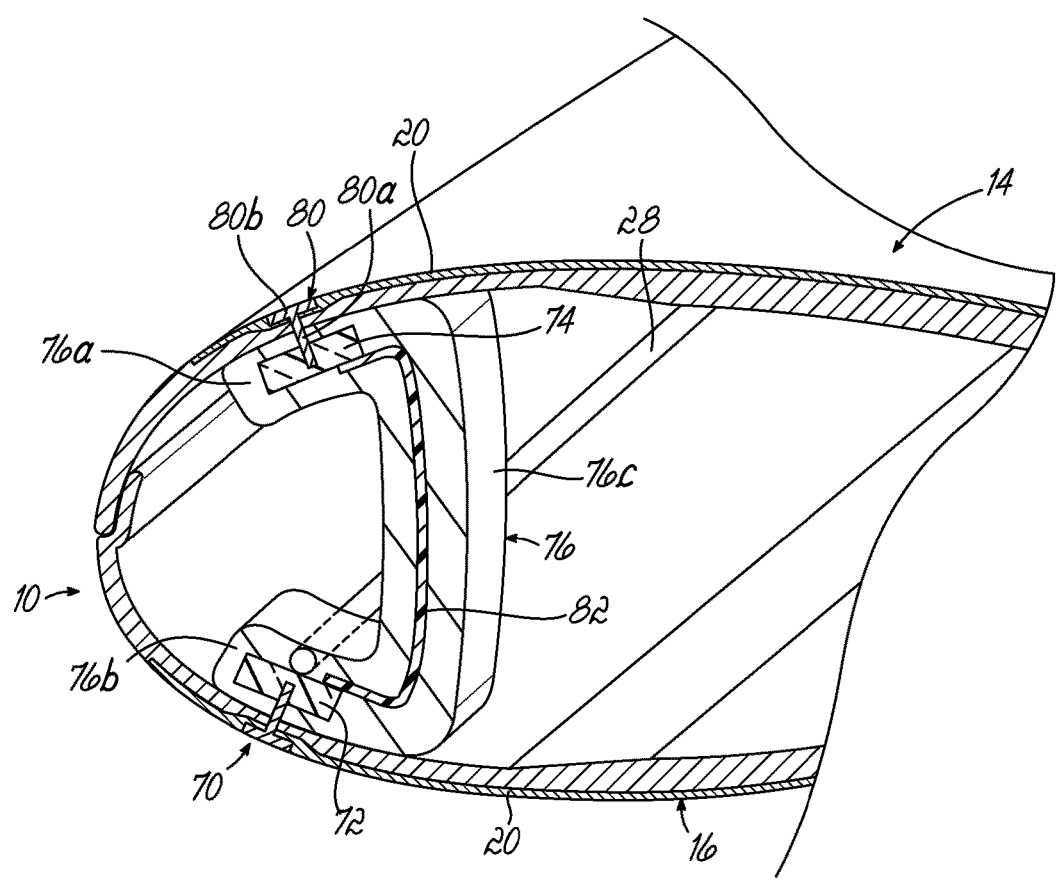
FIG. 5 is a section view of the leading edge of the turbine blade in FIG. 1 along the line C-C.

FIG. 5 is a cross-section through the blade 2 in FIG. 1 along the line C-C, and therefore illustrates a section of the surface protection layer 20 as described above.

As has been discussed, the surface protection layer 20 includes a conductive screen that provides a relatively large surface area to capture lightning strikes, from where the energy can be channelled safely into the down conducting system 26 without causing damage to the non-conductive composite structure of the blade 2. Note that the surface protection layer 20 is provided on both leeward and windward surfaces 14, 16 of the blade 2.

In order to connect the surface protection layer 20 to the down conducting system 26, a set of receptor components 70 are provided. There are four receptor components in total, one at each corner of the surface protection layer 20, although only one of the receptor components 70 is shown in FIG. 5.

In FIG. 5, the receptor component 70 is positioned adjacent the leading edge 10 of the blade 2. The receptor component 70 is shaped to fill more effectively the volume in the relatively deep profile of this region of the blade 2, compared with the relatively shallow profile in the region of the tip receptor array 22.

The receptor component 70 comprises first and second receptor bases 72, 74 that are encapsulated by an insulating member 76 that is generally annular in form. More specifically, the insulating member 76 in this embodiment is C-shaped, being defined by first and second arm portions 76a, 76b that extend from each end of a yoke portion 76c. Each of the receptor bases 72, 74 is encapsulated by a respective one of the arm portions 76a, 76b and in this manner the receptor bases 72, 74 are located in a predetermined position against a respective leeward 14 and windward surface 16 of the blade 2.

A first receptor element 80 electrically couples the surface protection layer 20 on the windward surface 16 to the first receptor base 72. In a similar manner to the embodiments discussed above, the receptor element 80 is in the form of a bolt having a shank 80a and a head 80b: the shank 80a extending through the blade 2 and engaging with the first receptor base 72; the head 80b being arranged to lie flush with the surrounding surface of the surface protection layer 20. An identical arrangement is provided to couple the surface protection layer 20 on the leeward surface 14 to the second receptor base 74.

A conductive link 82 is provided to electrically connect the first receptor base 72 to the second receptor base 74 and, in this embodiment, the conductive link 82 is a zinc coated copper braided wire. Although braided wire is not essential, it is useful from a manufacturing perspective since it is flexible and so can be suitably shaped to extend between the first and second receptor bases 72, 74 prior to encapsulation.

The insulating member 76 is sandwiched between an interior of the leeward surface 14 and an interior of the windward surface 16. Adhesive (not shown) is located between the insulating member 76 and the interiors of the leeward and windward surfaces 14, 16 to bond the insulating member to the interior of the blade. It should be appreciated that FIG. 5 shows a cross section through the insulating member 76 and that the first receptor base 72, the second receptor base 74 and the conductive link 82 are fully encapsulated by the insulating member 76. The insulating member 76 may have a width in the span-wise direction of around 15 cm.

Figure 6:
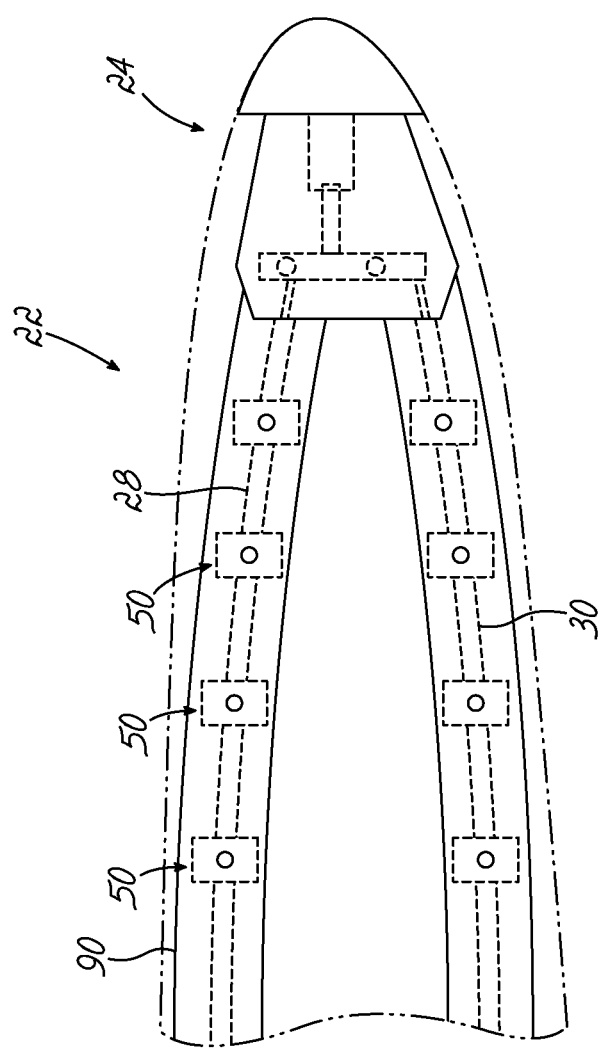
FIG. 6 is a view of a blade region like that in FIG. 2, but shows an alternative embodiment of the lightning protection sub-system.

Connection is made to the down conducting system 26 by welding the first receptor base 72 to a corresponding down conductor, which as illustrated is the first down conductor 28 near the leading edge 10 of the blade 2. For efficient assembly, the conductive link 82 and the down conductor 28 may be arranged in a predetermined pattern with respect to the first and second receptor bases 72, 74 and connected thereto by exothermic welding to ensure the electrical integrity of the connection prior to casting the insulating member 76 around the components. In this way, the receptor component 70 becomes installable as a unit together with the down conducting system 26. Welding is one option for connecting the electrical components although other suitable techniques such as mechanical clamping are acceptable In a variation of this, it is envisaged that the down conducting system 26 including both the first and second down conductors 28, 30 may be insulated as a unit with the receptor components 50 associated with the tip receptor array 22 as well as the receptor components 70 associated with the surface protection layer 20. FIG. 6 illustrates this, and it can be seen that the first and second down conductors 28, 30 and the receptor components 50 associated with the tip receptor array 22 are encapsulated by an elongate insulating element 90 that forms a unitary insulating housing. The insulating element 90 may take the place of the insulating elements 58 of the receptor bases 56, although currently it is envisaged that the insulating element 90 will be a further insulating measure in addition to the encapsulated receptor bases 56 and also the corona-reducing shielding of the down conductors 28, 30. In this embodiment, therefore, the entire electrical system within the blade 2 can be fully encapsulated prior to installation and can be installed as a single unit, rather like a wiring loom, into a blade half-shell during the blade lay-up phase. The encapsulation of the down conducting system 26 in an electrically isolating polymer reduces the probability of lightning strike attachment directly to the down conductors 28, 30 by increasing the dielectric breakdown strength of the system The first and second down conductors 28, 30 are themselves high voltage corona inhibiting cable insulated cables, insulated with either a cross linked polymer or silicone rubber. These insulated cables are then encapsulated into the elongate insulating element 90.

The insulating element 90 can be formed from polyurethane. In a particular embodiment, the stiffness of the polyurethane can varied along the length of the blade so that the down conducting system 26 has more flexibility in some parts of the blade than others. For example, it is desirable for the insulating element 90 to be flexible in the tip region of the blade where the blade deflects the most under wind loads, whereas towards the root of the blade the insulating element 90 can be stiffer.

The skilled person will appreciate that variations may be made to the illustrated embodiments without departing from the inventive concept, as described by the claims. Some variations to the illustrated embodiments have been discussed above. Others will now be explained.

The invention is described in the context of a turbine blade having a so-called 'structural shell' construction, in which longitudinal carbon ribs or pultrusions are integrated into the upper and lower shell-halves during the lay-up phase. However, the invention is also applicable to blades constructed according to a different design philosophy such as a structural spar construction.

The blade tip assembly 24 has been described as including a blade tip module 32 of solid metal. Although this is preferred for reasons of conductivity and resilience to blade strikes, it could also be formed from a non-conductive core having a conductive outer layer, although robustness may be adversely affected.

In the insulating arrangement described above, the insert member 34 is described as single part. However, it should be appreciated that it could also be fabricated from multiple parts.

In the above embodiments, it has been described that the blade is divided into three zones, A, B, and C, for the purposes of lightning protection. It will be appreciated that this is merely an example of how a blade may be configured for lightning protection and is not intended to be limited. For example, a blade may be configured so that zone A is omitted. In effect, therefore, the blade is protected along its entire length instead of leaving a zone relatively unprotected from lightning strikes.

The invention claimed is:

1. A wind turbine blade including a lightning protection system, the lightning protection system comprising:
   a conductive blade tip module;
   a receptor arrangement electrically coupled to the blade tip module, the receptor arrangement including a receptor component;
   a down conductor connected to the receptor component; and
   an insulating member encapsulating the receptor component and at least a portion of the down conductor,
   wherein at least the insulating member and the receptor arrangement are configured as a pre-manufactured unit.

2. The wind turbine blade of claim 1, wherein the insulating member is polymeric.

3. The wind turbine blade of claim 2, wherein the insulating member is polyurethane.

4. The wind turbine blade of claim 1, wherein the receptor component includes a receptor base for receiving a first receptor element which extends to an external surface of the blade.

5. The receptor arrangement of claim 1, wherein the receptor component includes a receptor base for receiving a first receptor element and a second receptor element which extend to an external surface of the blade.

6. The wind turbine blade of claim 1, wherein the receptor component includes a first receptor base associated with a first blade surface region and a second receptor base associated with a second blade surface region, wherein the first receptor base and the second receptor base are encapsulated by the insulating member.

7. The wind turbine blade of claim 6, wherein the first receptor base and the second receptor base are connected by an electrical link.

8. The wind turbine blade of claim 7, wherein the electrical link extends within the insulating member.

9. The wind turbine blade of claim 8, wherein the receptor component is exothermically welded to the down conductor.

10. The wind turbine blade of claim 9, wherein the insulating housing is defined by the insulating member that encapsulates the receptor component and which also encapsulates the down conductor.

11. The wind turbine blade of claim 8, wherein the down conductor and the receptor component are contained within an insulating housing.

12. The wind turbine blade of claim 11, wherein the insulating housing comprises the insulating member and is common to the receptor component and the down conductor.

13. The wind turbine blade of claim 11, wherein the insulating housing is a polymeric part that is moulded substantially to encapsulate the receptor base and the down conductor.

14. The wind turbine blade of claim 1, wherein the insulating member is annular.

15. The wind turbine blade of claim 1, wherein the receptor component is connected to a down conductor.

16. The wind turbine blade of claim 1, comprising a windward shell having a windward surface and a leeward shell having a leeward surface, a first receptor element associated with the windward surface and a second receptor element associated with the leeward surface, wherein the first receptor element connects to the receptor component and wherein the second receptor element connects to the receptor component.

17. The wind turbine blade of claim 16, wherein the insulating member extends from the windward shell to the leeward shell.

18. The wind turbine blade of claim 17, wherein the insulating member is bonded to an interior of the windward shell and the leeward shell.

19. A method of assembling a lightning protection apparatus for a wind turbine blade, comprising:
   arranging a plurality of receptor bases in a predetermined pattern, the plurality of receptor bases configured to extend along a longitudinal direction of the wind turbine blade;
   connecting the plurality of receptor bases to a down conductor configured to extend along the longitudinal direction of the wind turbine blade; and
   forming a plurality of insulating members, each insulating member encasing one of the plurality of receptor bases and at least a portion of the down conductor,
   wherein the lightning protection apparatus forms a pre-manufactured unit.

20. The method of claim 19, comprising moulding a unitary insulating housing about the plurality of receptor bases and the down conductor.

21. The method of claim 20, comprising encasing the plurality of receptor bases in a respective insulating member before the unitary housing is moulded.

* * * * *